(12) United States Patent
Yamagami et al.

(10) Patent No.: US 11,871,141 B2
(45) Date of Patent: Jan. 9, 2024

(54) IMAGE PROCESSING APPARATUS AND IMAGE DISPLAY SYSTEM

(71) Applicant: DENSO CORPORATION, Kariya (JP)

(72) Inventors: Yuki Yamagami, Kariya (JP); Akira Egashira, Kariya (JP)

(73) Assignee: DENSO CORPORATION, Kariya (JP)

( * ) Notice: Subject to any disclaimer, the term of this patent is extended or adjusted under 35 U.S.C. 154(b) by 462 days.

(21) Appl. No.: 17/211,264

(22) Filed: Mar. 24, 2021

(65) Prior Publication Data

US 2021/0211605 A1 Jul. 8, 2021

Related U.S. Application Data

(63) Continuation of application No. PCT/JP2019/037876, filed on Sep. 26, 2019.

(30) Foreign Application Priority Data

Sep. 26, 2018 (JP) .................. 2018-180347

(51) Int. Cl.
| | |
|---|---|
| *H04N 5/775* | (2006.01) |
| *B60R 1/00* | (2022.01) |
| *H04N 5/77* | (2006.01) |
| *H04N 5/91* | (2006.01) |
| *H04N 23/80* | (2023.01) |
| *H04N 23/90* | (2023.01) |

(52) U.S. Cl.
CPC ............... *H04N 5/775* (2013.01); *B60R 1/00* (2013.01); *H04N 5/77* (2013.01); *H04N 5/91* (2013.01); *H04N 23/80* (2023.01); *H04N 23/90* (2023.01); *B60R 2300/30* (2013.01)

(58) Field of Classification Search
CPC ........... H04N 5/775; H04N 5/77; H04N 5/91; H04N 23/80; H04N 23/90; H04N 7/18; H04N 23/63; H04N 19/433; H04N 1/2104; H04N 1/2129; H04N 1/2133; B60R 1/00; B60R 2300/30; G09G 5/00; G09G 5/395

See application file for complete search history.

(56) References Cited

U.S. PATENT DOCUMENTS

| | | | |
|---|---|---|---|
| 9,767,529 B1* | 9/2017 | Liu ...................... | H04N 19/433 |
| 2009/0132771 A1* | 5/2009 | Wang .................... | G09G 5/393 |
| | | | 711/E12.001 |
| 2014/0321828 A1* | 10/2014 | Hashizume ............ | H04N 5/772 |
| | | | 386/229 |
| 2018/0324391 A1* | 11/2018 | Ozawa .................. | H04N 7/181 |
| 2021/0142767 A1* | 5/2021 | Mo ......................... | G06F 1/08 |

FOREIGN PATENT DOCUMENTS

JP 6311646 B2 4/2018

* cited by examiner

*Primary Examiner* — Chiawei Chen
(74) *Attorney, Agent, or Firm* — MASCHOFF BRENNAN

(57) ABSTRACT

The image processing apparatus is provided with an image acquiring unit, an image processing unit, and an image outputting unit. The image processing unit includes a memory unit. The memory unit includes: a plurality of memory regions; a first updating unit configured to sequentially perform a first updating process that updates memory contents of the memory regions using the memory image; a second updating unit configured to sequentially perform a second updating process that updates memory contents of the memory regions using a specific image; and a reading unit configured to sequentially perform a reading process that reads an image stored in the memory regions.

5 Claims, 5 Drawing Sheets

IMAGE PROCESSING APPARATUS AND IMAGE DISPLAY SYSTEM

This application is the U.S. bypass application of International Application No. PCT/JP2019/037876 filed Sep. 26, 2019 which designated the U.S. and claims priority to Japanese Patent Application No. 2018-180347, filed Sep. 26, 2018, the contents of which are incorporated herein by reference.

BACKGROUND

Technical Field

The present disclosure relates to image processing apparatuses and image display systems.

Description of the Related Art

An image display system of a vehicle is provided with a camera, an image processing apparatus and a display unit. The camera captures a scene around the vehicle and generates an image. The image processing unit performs image processing on the image generated by the camera. The display unit displays an image after image processing.

SUMMARY

The present disclosure provides an image processing apparatus including an image acquiring unit configured to acquire a first image from an imaging apparatus; an image processing unit configured to perform image processing for the first image; and an image outputting unit configured to output the second image to an image display unit. The image processing unit is provided with a memory unit configured to temporarily store a memory image which is either the first image or the second image.

DETAILED DESCRIPTION OF THE PREFERRED EMBODIMENTS

As a conventional art, Japanese Patent No. 6311646 discloses an image display system of a vehicle provided with a camera, an image processing apparatus and a display unit. The camera captures a scene around the vehicle and generates an image. The image processing unit performs image processing on the image generated by the camera. The display unit displays an image after image processing. The display unit is disposed in a vehicle cabin.

As a result of the inventor's detailed research, the following problems have been found. Generally, the image processing unit is provided with a memory unit which temporarily stores an image. The contents of the memory unit are regularly updated with a newly generated image. In the case where a fault or the like occurs in the camera causing a false update of the contents of the memory unit, older images remain in the memory unit. Then, the display unit sometimes displays older images. In this respect, there is a concern that the user may misrecognize older images displayed on the display unit to be the latest images. Moreover, since the image processing unit cannot determine whether scenes obtained from the images remained in the memory unit are the latest images or older images, a phenomenon (hereinafter referred to as false updating) in which older images are remained in the memory unit without being updated cannot be detected.

For exemplary embodiments of the present disclosure will described with reference to the drawings.

First Embodiment

1. Configuration of an Image Display System 1

Figure 1:
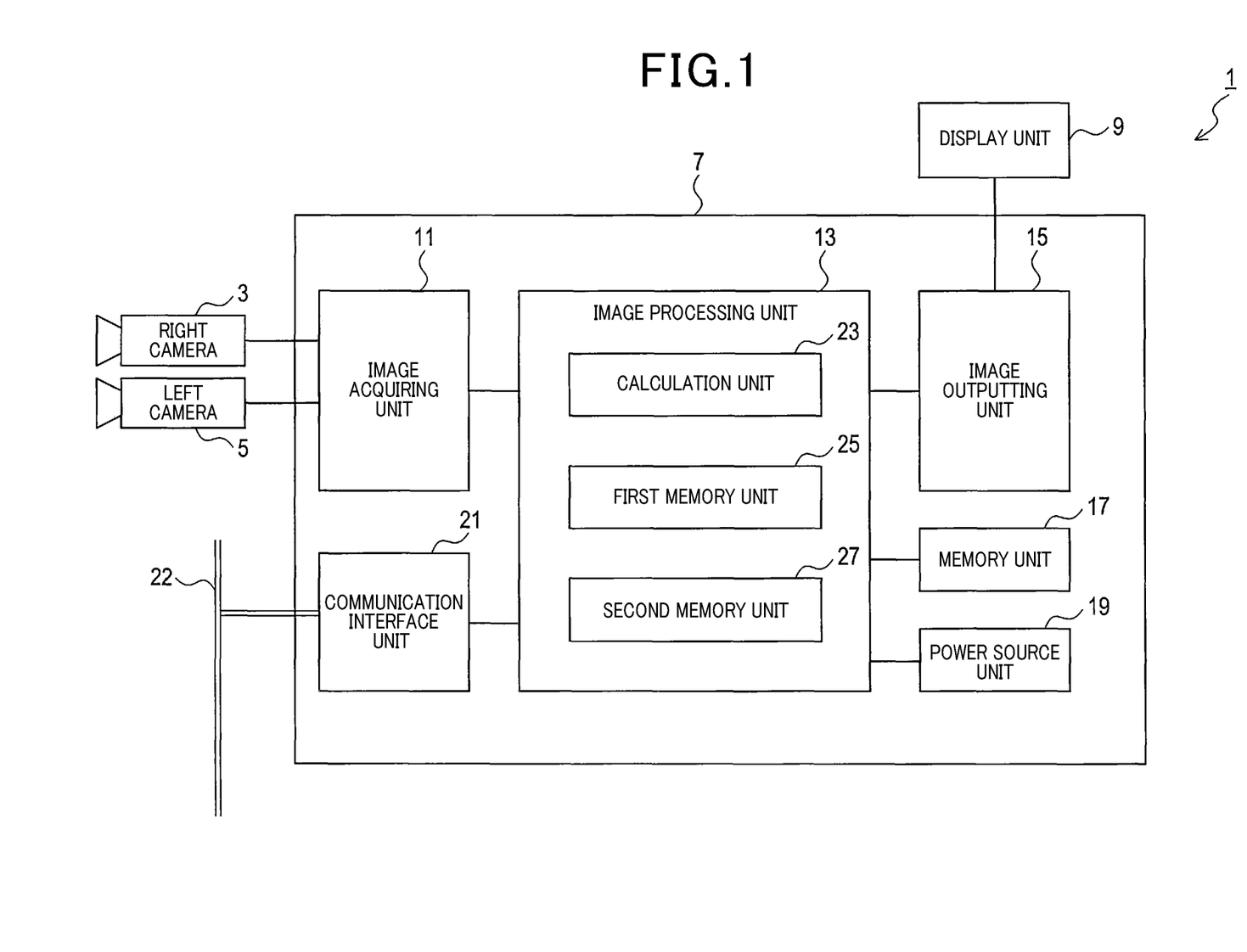
FIG. 1 is a block diagram showing a configuration of an image display system.

A configuration of an image display system 1 will be described with reference to the drawings. The image display system 1 is mounted on a vehicle. As shown in FIG. 1, the image display system 1 is provided with a right camera 3, a left camera 5, an image processing unit 7 and a display unit 9. The right camera 3 and the left camera 5 correspond to an imaging apparatus and the display unit 9 corresponds to an image display apparatus.

The right camera captures a scene at a rear right side of the vehicle and generates an image. The left camera 5 captures a scene at a rear left side of the vehicle and generates an image. The image generated by the right camera 3 is defined as a first image RP. The image generated by the left camera is defined as a first image LP.

The right camera 3 and the left camera 5 each repeatedly generate an image at a predetermined period. Hereinafter, the first image RP may be expressed as first image RP1, RP2, RP3, RP4 and so on, in order to distinguish a plurality of first images repeatedly generated at the predetermined period by the right camera 3. The first image RP (i+1) refers to an image generated subsequent to the first image i. Note that i is a natural number of 1 or larger.

The image processing unit 7 is provided with an image acquiring unit 11, an image processing unit 13, an image outputting unit 15, a memory unit 17, a power source unit 19 and a communication interface unit (I/F) 21.

The image acquiring unit 11 acquires the first image RP from the right camera 3, and the first image LP from the left camera 5. The image acquiring unit 11 transmits the first image RP and the first image LP to the image processing unit 13.

The image processing unit 13 is provided with a calculation unit 23, a first memory unit 25 and a second memory unit 27. The calculation unit 23 applies image processing to the first image RP to generate the second image RP. The calculation unit 23 applies image processing to the second image LP to generate the second image LP. The image processing includes, for example, a process for extracting a part of an image, a process for converting an image to be an image having a different viewpoint and a process for synthesizing a plurality of images.

The first memory unit 25 includes a function in which the first image RP and the first image LP are temporarily stored, and thereafter the first image RP and the first image LP are transmitted to the calculation unit 23. The first memory unit 25 functions as a buffer.

Figure 2:
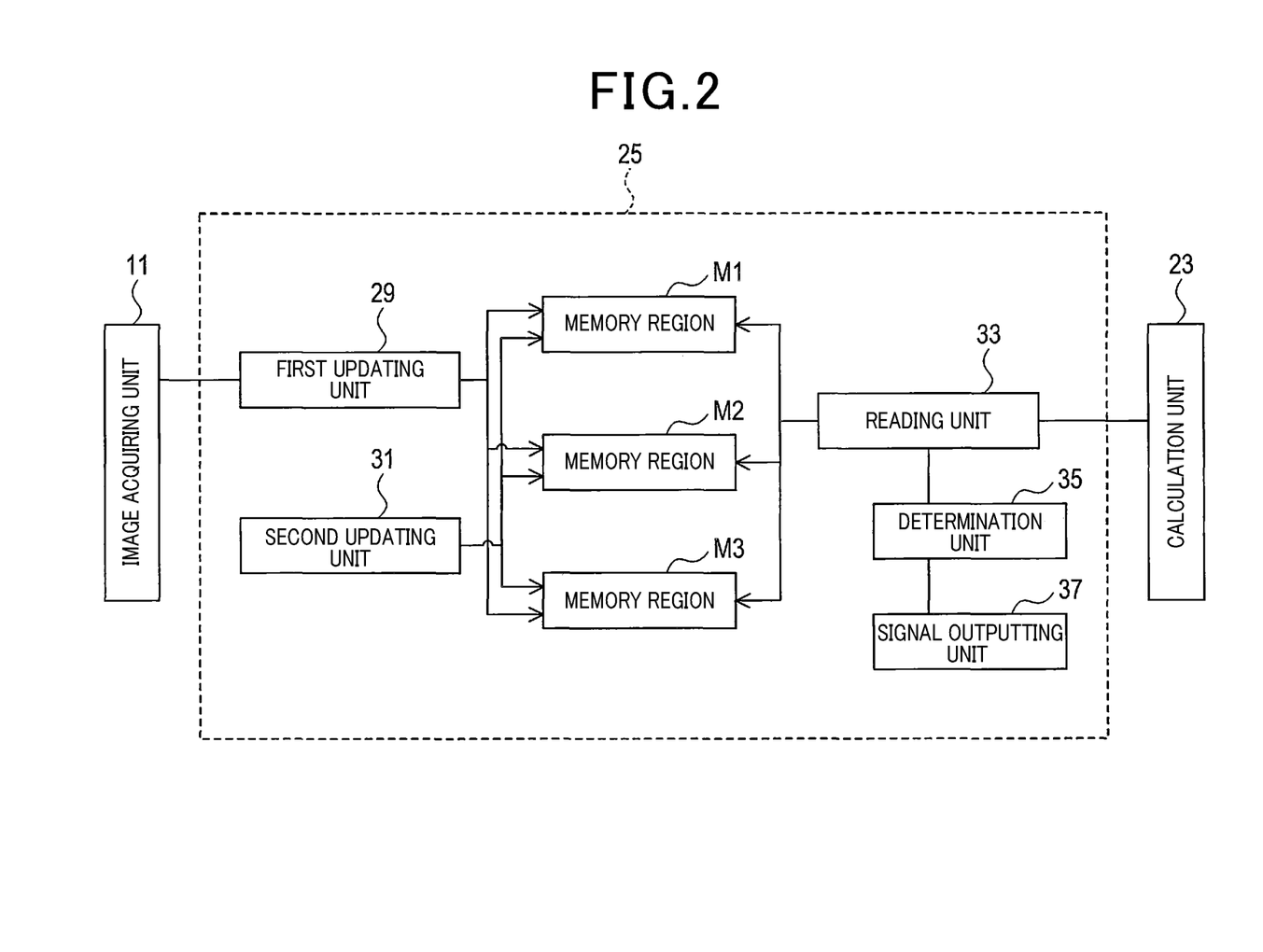
FIG. 2 is an explanatory diagram showing a configuration of a first memory unit.

As shown in FIG. 2, the first memory unit 25 is provided with memory regions M1 to M3, a first updating unit 29, a second updating unit 31, a reading unit 33, a determination unit 35, and a signal outputting unit 37. The memory regions M1 to M3 are virtually configured by the memory unit 17. The memory regions M1 to M3 correspond to a plurality of memory regions.

The second memory unit 27 temporarily stores the second image RP and the second image LP and then transmits the second image RP and the second image LP to the image outputting unit 15. The second memory unit 27 serves as a buffer.

The second memory unit 27 has a configuration similar to the first memory unit 25. However, in the second memory unit 27, the first updating unit is not connected to the image acquiring unit 11 but connected to the calculation unit 23. The reading unit 33 is not connected to the calculation unit 23 but connected to the image outputting unit 15.

The image outputting unit 15 receives the second image RP and the second image LP from the image processing unit 13, and outputs them to the display unit 9.

Note that the image display system 1 may preferably be applied to an electronic mirror system, a rear backup camera or the like. The rear backup camera is configured to display rear-view images when the vehicle is in reversing.

In the case where the image display system 1 is applied to an electronic mirror system, the display unit 9 is disposed in each of the left side and the right side in the vehicle cabin. The second image LP outputted by the image outputting unit 15 is displayed on the display unit 9 in the left side.

The memory unit 17 provides the memory regions M1 to M3. The power source unit 19 provides a power source to the image processing unit 7. The communication interface unit 21 is connected to an on-vehicle communication bus 22. The communication interface unit 21 acquires information indicating a vehicle speed, a shift range, a turn signal or the like via the on-vehicle communication bus 22, and transmits the acquired information to the image processing unit 13. The transmitted information is used for image processing.

The display unit 9 is disposed in the vehicle cabin. The display unit 9 displays an image outputted by the image outputting unit 15.

2. Process Executed by the Image Display System 1

(2-1) Overall Process

The overall process executed by the image display system 1 will be described as follows. The right camera 3 repeatedly generates the first image RP at a predetermined period. The left camera 5 repeatedly generates the first image LP at a predetermined period.

The image acquiring unit 11 sequentially acquires the first image RP and the first image LP and transmits the acquired images to the image processing unit 13. The first memory unit 25 temporarily stores the first image RP and the first image LP and transmits them to the calculation unit 23.

The calculation unit 23 applies the image processing to the first image RP to generate the second image RP. The calculation unit 23 applies the image processing to the first image LP to generate the second image LP. The second memory unit 27 temporarily stores the second image RP and the second image LP and transmits them to the image outputting unit 15.

The image outputting unit 15 outputs the second image RP and the second image LP to the display unit 9. The display unit 9 displays the second image RP and the second image LP.

(2-2) Process Executed by the First Memory Unit 25

The process executed by the first memory unit 25 will be described with reference to FIGS. 2 to 4. The first memory unit 25 performs similar process to each of the first image RP and the first image LP. Here, a process applied to the first image RP will be described. In the process executed by the first memory unit 25, the first image RP and the first image LP correspond to a memory image.

Figure 3:
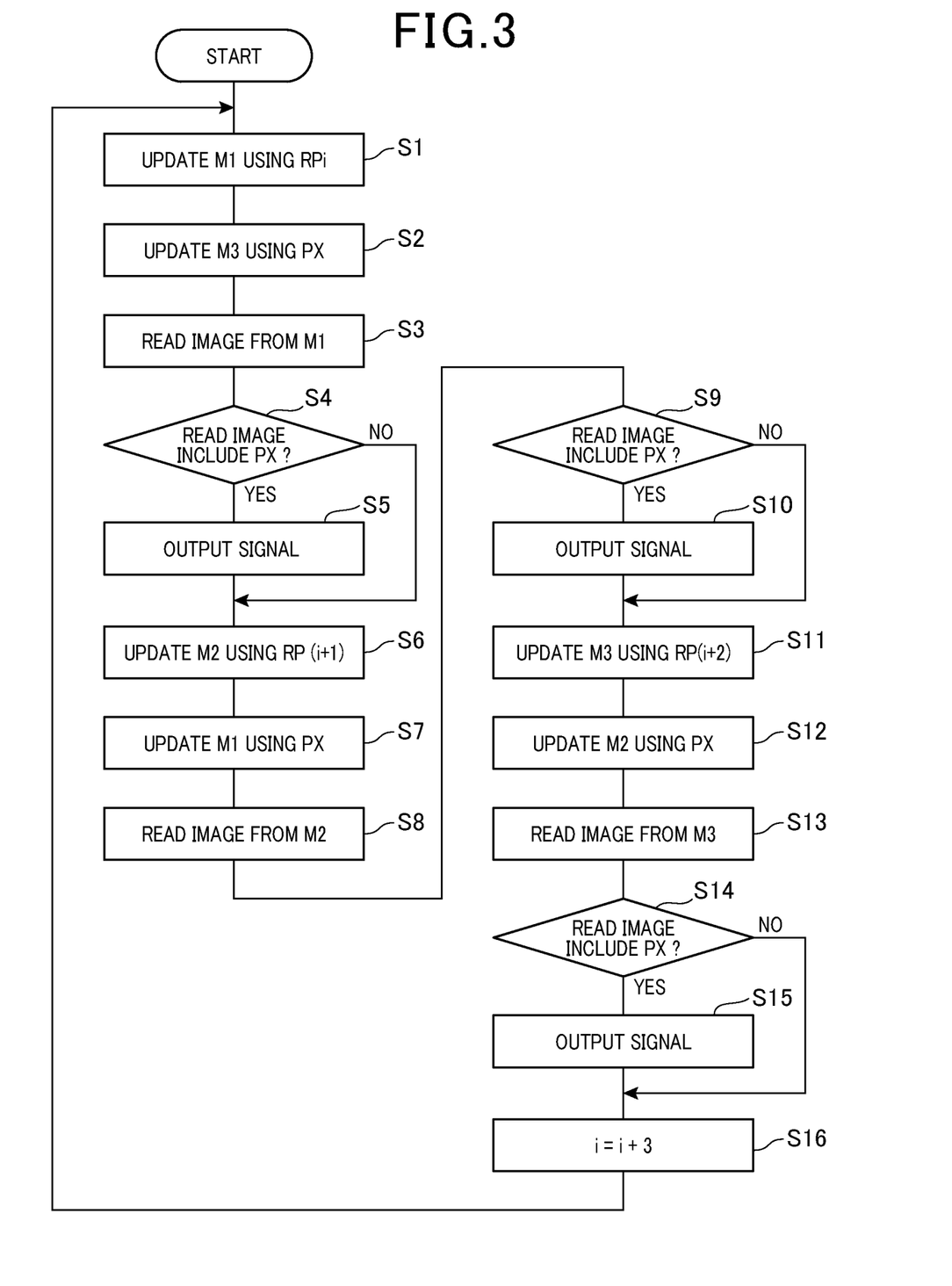
FIG. 3 is a flowchart showing a process executed by the first memory unit.
Figure 4A:
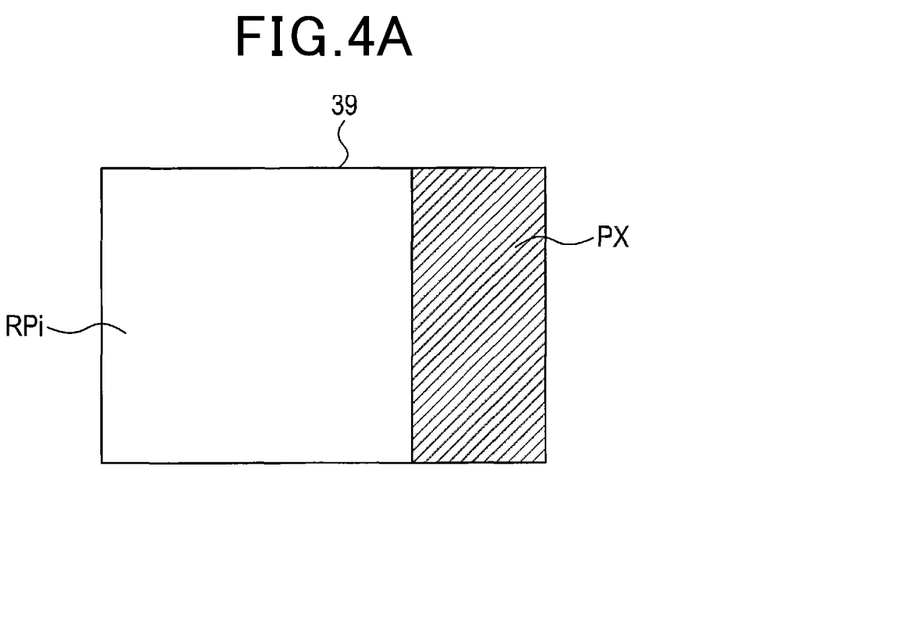
FIG. 4A is an explanatory diagram showing an image read from a memory region when a horizontal synchronization signal failure has occurred.
Figure 4B:
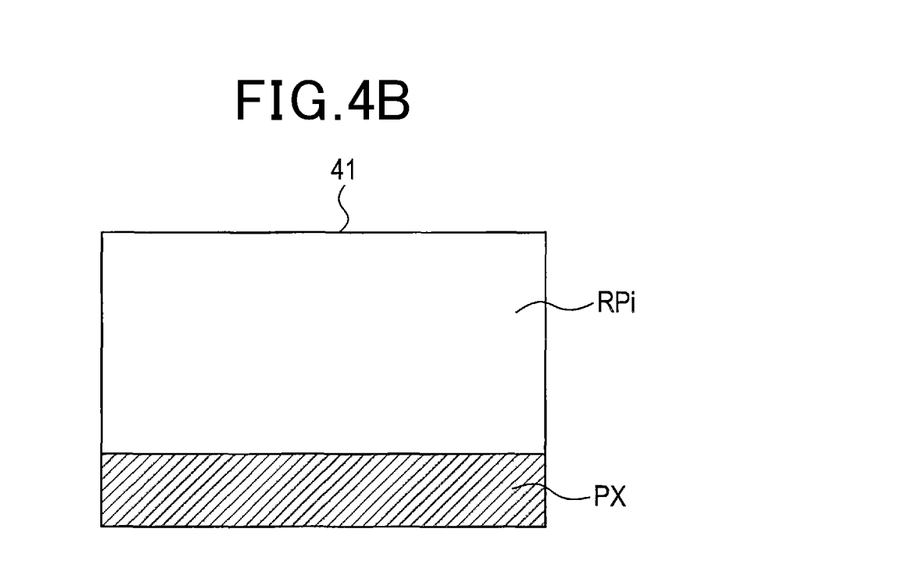
FIG. 4B is an explanatory diagram showing an image read from the memory region when a vertical synchronization signal failure has occurred.

At the step 1 shown in FIG. 3, the first updating unit 29 performs a first updating process in which the memory content of the memory region M1 is updated using the first image RPi. Note that i is a natural number of 1 or larger.

When the first updating process is performed correctly, the memory content of the memory region M1 becomes the first image RPi. When the first updating process is not performed correctly, the memory content of the memory region M1 becomes an image before updating or an abnormal image. The image before updating is a specific image PX which will be described later.

At step 2, the second updating unit 31 performs a second updating process in which the memory content of the memory region M3 is updated using a specific image PX. The specific image PX refers to an image having a specific form. The specific image PX is an image in which the user is able to distinguish the first image RP and the first image LP. The specific image PX includes, for example, an image having uniform color and luminance (hereinafter referred to as uniform image) and an image in which a regular pattern is expressed. The image processing unit 7 holds in advance, for example, a specific image PX. Further, when the specific image PX is a uniform image, the image processing unit 7 may store a predetermined color value and apply the stored color value to all pixels of the image when performing the second updating process, thereby generating the specific image PX. After completing the second updating process, the memory content of the memory region M3 becomes specific image PX.

Note that an order is set in advance for the memory regions M1 to M3. The order is a cyclic order such as M1→M2→M3→M1→M2→M3. The memory region M3 is at one position before to the memory region M1.

At step 3, the reading unit 33 performs a reading process that reads the image stored in the memory region M1. The reading unit 33 transmits the read image to the calculation unit 23.

At step 4, the determination unit 35 determines whether the image read at the step 3 includes the specific image PX. The image read at the step 3 including the specific image PX includes, for example, an image 39 shown in FIG. 4A, and an image 41 shown in FIG. 4B.

In the image 39, an image in a part of area in the horizontal direction forms a specific image PX and an image in the other area in the horizontal direction forms a first image RPi. In the case where a failure occurs in the horizontal synchronous signal at the step 1, a part of the memory content of the memory region M1 in the horizontal direction cannot be updated so that the memory content of the memory region M1 becomes the image 39. As a result, the image read at step 3 is the image 39.

In the image 41, an image in a part of an area in the vertical direction forms a specific image PX and an image in the other area in the vertical direction forms a first image RPi. In the case where a failure occurs in the vertical synchronous signal at the step 1, a part of the memory content in the memory region M1 in the vertical direction cannot be updated so that the memory content of the memory region M1 becomes the image 41. As a result, the image read at step 3 is the image 41.

Note that when the first updating process is correctly performed at step 1, the overall image read at the step 3 is the first image RPi and the specific image PX is not included.

When the image read at step 3 includes the specific image PX, the process proceeds to step 5. When the image read at step S3 does not include the specific image PX, the process proceeds to step 6.

At step 5, the signal output unit 37 outputs a signal indicating abnormality on the read image. The display unit 9 or other apparatus is able to notify the user of occurrence of updating failure or perform countermeasure of the updating failure in accordance with the signal. The countermeasures against the updating failure may be performed, for example, by any configuration included in the image display system 1.

At step 6, the first updating unit 29 performs a first updating process which updates the memory content of the memory region M2 using the first image RP (i+1). The memory region M2 is at one position after the memory region M1.

When the first updating process is performed correctly, the memory content of the memory region M2 becomes the first image RP(i+1). When the first updating process is not performed correctly, the memory content of the memory region M2 becomes an image before the updating or an abnormal image. The image before the updating is the specific image PX.

At step 7, the second updating unit 31 performs a second updating process which updates the memory content of the memory region M1 using the specific image PX. After completing the second updating process, the memory content of the memory region M1 becomes a specific image PX. The memory region M1 is at one position before the memory region M2.

At step 8, the reading unit 33 performs a reading process which reads an image stored in the memory region M2. The reading unit 33 transmits the read image to the calculation unit 23.

At step 9, the determination unit 35 determines whether the image read at the step 8 includes the specific image PX. In the case where the image read at the step 8 includes the specific image PX, the process proceeds to step 10. In the case where the image read at step 8 does not include the specific image PX, the process proceeds to step 11.

At step 10, the signal output unit 37 outputs a signal indicating abnormality in the read image. The display unit 9 or other apparatus is able to notify the user of occurrence of updating failure or perform countermeasures against the updating failure in accordance with the signal. The countermeasures against the updating failure may be performed, for example, by any configuration included in the image display system 1.

At step 11, the first updating unit 29 performs a first updating process which updates the memory content of the memory region M3 using the first image RP (i+2). The memory region M3 is at one position after the memory region M2. When the first updating process is performed correctly, the memory content of the memory region M3 becomes the first image RP(i+2). When the first updating process is not performed correctly, the memory content of the memory region M3 becomes an image before the updating or an abnormal image. The image before the updating is the specific image PX.

At step 12, the second updating unit 31 performs a second updating process which updates the memory content of the memory region M2 using the specific image PX. After completing the second updating process, the memory content of the memory region M2 becomes a specific image PX. The memory region M2 is at one position before the memory region M3.

At step 13, the reading unit 33 performs a reading process which reads an image stored in the memory region M3. The reading unit 33 transmits the read image to the calculation unit 23.

At step 14, the determination unit 35 determines whether the image read at the step 13 includes the specific image PX. In the case where the image read at the step 13 includes the specific image PX, the process proceeds to step 15. In the case where the image read at step 13 does not include the specific image PX, the process proceeds to step 16.

At step 15, the signal output unit 37 outputs a signal indicating abnormality on the read image. The display unit 9 or other apparatus is able to notify the user of occurrence of updating failure or perform countermeasure of the updating failure in accordance with the signal.

The countermeasure against the updating failure may be performed, for example, by any configuration included in the image display system 1.

At step 16, the first memory unit 25 increments the i value by 3. Thereafter, the process returns to step 1.

Figure 5:
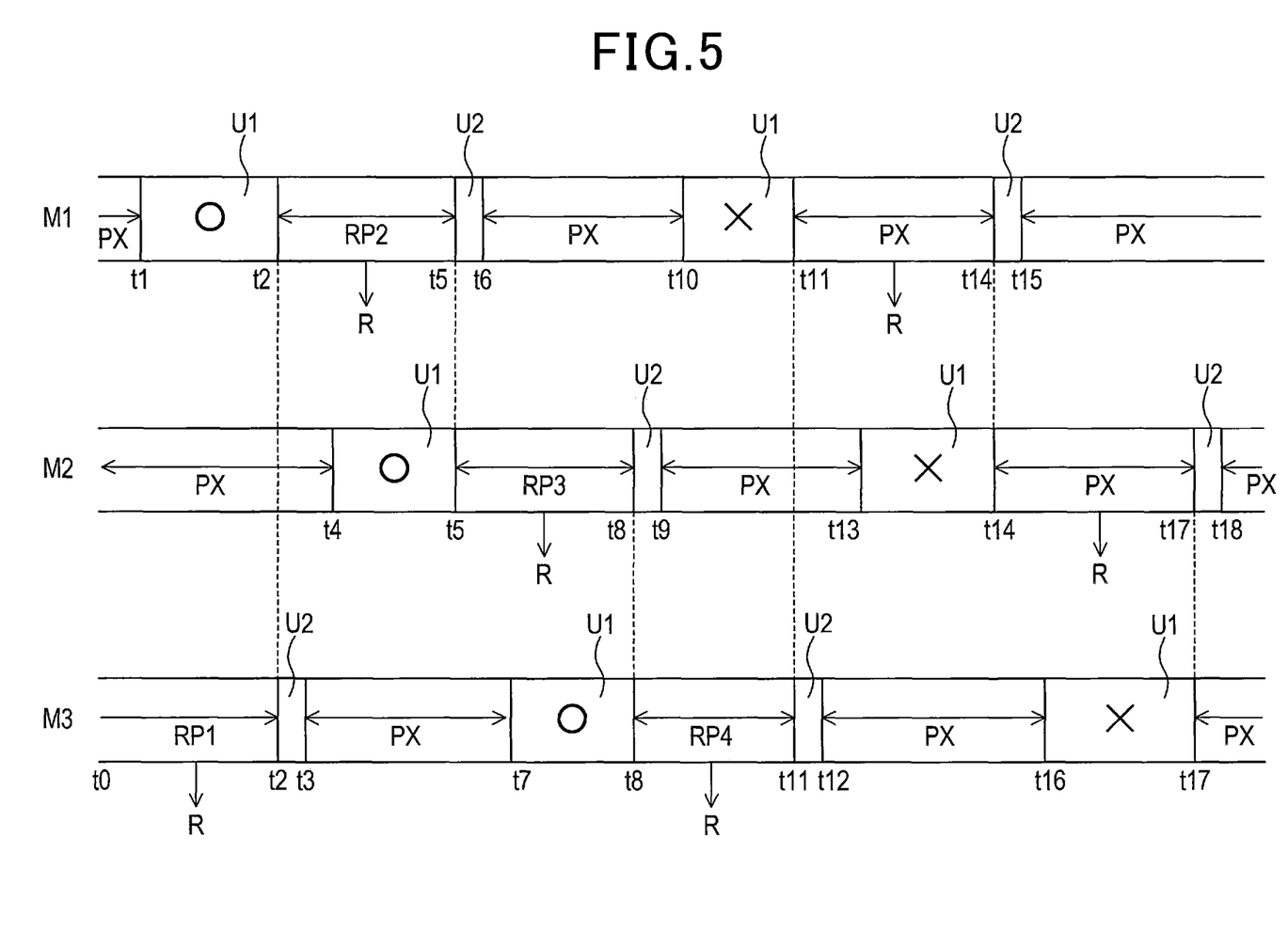
FIG. 5 is a timing diagram showing a process executed by the first memory unit.

FIG. 5 illustrates a timing diagram showing an example of the above-described process. The first updating unit 29 applies a first updating process U1 to the memory region M1 in a period from a time t1 to a time 2. Subsequently, the first updating unit 29 applies the first updating process U1 to the memory region M2 in a period from a time t4 to a time t5. Next, the first updating unit 29 applies the first updating process U1 to the memory region M3 in a period from a time t7 to a time t8.

Next, the first updating unit 29 applies the first updating process U1 to the memory region M1 in a period from a time t10 to a time t11. Subsequently, the first updating unit 29 applies the first updating process U1 to the memory region M2 in a period from a time t13 to a time t14. Next, the first updating unit 29 applies the first updating process U1 to the memory region M3 in a period from a time t16 to a time t17. Thus, the first updating unit 29 applies the first updating process U1 to each of the plurality of memory regions M1 to M3 in accordance with the order set in advance.

The second updating unit 31 applies a second updating process U2 to the memory region M3 in a period from a time t2 to a time t3. Next, the second updating unit 31 applies a second updating process U2 to the memory region M1 to the memory region M1 in a period from a time t5 to a time t6. Subsequently, the second updating unit 31 applies the second updating process U2 to the memory region M2 in a period from a time t8 to a time t9.

Next, the second updating unit 31 applies the second updating process U2 to the memory region M3 in a period from a time t11 to a time t12. Next, the second updating unit 31 applies the second updating process U2 to the memory region M1 in a period from a time t14 to a time t15. Subsequently, the second updating unit 31 applies the second updating process U2 to the memory region M2 in a period from a time t17 to a time t18. Thus, the second updating unit 31 applies the second updating process U2 to each of the plurality of memory regions M1 to M3 in accordance with the order set in advance.

The second updating unit 31 *t* applies the second updating process U2 after completing the first updating process U1 for the memory region which is later in the order than the memory region to which the second updating process U2 is applied.

For example, the second updating unit 31 applies the second updating process U2 to the memory region M3 in a period from a time t2 to a time t3 after completing the first updating process U1 for the memory region M1 in a period from a time t1 to a time t2.

The second updating unit 31 applies the second updating process U2 to the memory region which is at one position before the memory region where the latest first updating process U1 is completed.

For example, the memory region where the latest first updating process U1 is completed at time t2, refers to the memory region M1. The memory region which is at one position before the memory region M1, refers to the memory region M3. The second updating unit 31 applies the second updating process U2 to the memory region M3 in a period from a time t2 to a time t3.

The reading unit 33 reads the image stored in the memory region M3 in a period R from a time t0 to a time t2. Next, the reading unit 33 reads the image stored in the memory region M1 in a period R from a time t2 to a time t5. Subsequently, the reading unit 33 reads the image stored in the memory region M2 in a period R from a time t5 to a time t8.

Next, the reading unit 33 reads the image stored in the memory region M3 in a period R from a time t8 to a time t11. Subsequently, the reading unit 33 reads the image stored in the memory region M1 in a period R from a time t11 to a time t14. Next, the reading unit 33 reads the image stored in the memory region M2 in a period R from a time t14 to a time t17. Any period R is a period from a time when the first updating process U1 is completed to a time when the second updating process U2 starts.

According to an example shown in FIG. 5, the first updating process U1 in a period from a time t1 to a time t2, the first updating process U1 in a period from a time t4 to a time t5, and the first updating process in a period from a time t7 to a time t8 are performed correctly. Hence, each of the images read by the reading unit 33 in a period R from a time t2 to a time t5, a period R from a time t5 to a time t8 and a period R from a time t8 to a time t11 is the first image RP.

The first updating process U1 in a period from a time t10 to a time t11, the first updating process U in a period from a time t13 to a time t14, the first updating process U3 from a time t16 to a time t17 are not performed correctly, and the specific image PX before updating remains in the memory region. Therefore, each of the images read by the reading unit 33 in a period R from a time t11 to a time t14, a period R from a time t14 to a time t17, and a period R after a time t17 is the specific image PX.

(2-3) Process Executed by the Second Memory Unit 27

The second memory unit 27 performs a process similar to that of the first memory unit 25. However, the images stored in the memory regions M1 to M3 are not the first image RP nor the second image LP, but the second image RP and the second image LP. Also, the second memory unit 27 transmits the images read from the memory regions M1 to MR not to the calculation unit 23 but to the image outputting unit 15. In the processes executed by the second memory unit 27, the second image RP and the second image LP correspond to the memory image.

3. Effects and Advantages Obtained from the Image Display System 1

(1A) According to the image system 1, in the case where the first updating process is not correctly performed, the image displayed on the display unit 9 is a specific image PX. Hence, even when the first updating process is not correctly performed, old images which have been stored in the memory regions M1 to M3 before performing the first updating process can be prevented from being displayed on the display unit 9. As a result, old images displayed on the display unit 9 can be prevented from being misrecognized as the latest image by the user.

The image display system 1 can be applied to an electronic mirror system, a rear backup camera or the like. The electronic mirror system and the rear backup camera are utilized, similar to the optical mirror, for the user to confirm the state around the vehicle and to operate the vehicle. If the electronic mirror system and the rear backup camera display past images, there is a concern that the user may see the past images and mistakenly recognize the state around the vehicle, which may cause danger.

Since the image display system 1 prevents the old images from being displayed on the display 9 as described above, the user can be prevented from mistakenly recognizing the state around the vehicle due to the past images.

(1B) According to the image display system 1, when the first updating process is not correctly performed, the specific image PX is displayed on the display unit 9. Hence, the user can readily know about the first updating process not being performed correctly.

(1C) The second updating unit 31 applies the second updating process to the memory region which is at one position before the memory region where the latest first updating process is completed. Hence, the memory content of the memory regions can be updated earlier by using the specific image PX. As a result, the above-described effects and advantages of (1A) and (1B) can be reliably obtained.

(1D) According to the second memory unit 27, the above-described effects and advantages of (1A) to (1C) can be obtained with the processes of temporarily storing the second image RP and the second image LP.

(1E) The image display system 1 determines whether the image read by the reading unit 33 includes the specific image. The image display system 1 outputs the signal indicating the determination result. Therefore, according to the image display system 1, the user readily knows whether the images read by the reading unit 33 are correct images. According to the image display system 1, whether the images read by the reading unit 33 are abnormal images can readily be detected.

OTHER EMBODIMENTS

The embodiments of the present disclosure is described so far. The present disclosure is not limited to the above-described embodiments, but may be modified in various ways.

(1) The number of cameras included in the image display system 1 may be one or larger than 3. The calculation unit 23 may synthesizes a plurality of first images to generate a single second image. As a single second image, for example, a bird's-eye view in which the vehicle is viewed from the above or the like can be utilized.

(2) The image display system 1 may not perform the second updating process at either the first memory unit 25 or the second memory unit 27.

(3) The frequency of performing the second updating prices may be lower than that of the first updating process. For example, the image display system 1 may perform one second updating process for every Nth updating process. Note that N is 2 or more of natural number.

(4) The number of the plurality of memory regions included in the image display system 1 may be any number other than 3. For example, the number of the plurality of memory regions may be 2, 4, 5, 6 and so on.

(5) The image display system 1 may perform a second updating process limited for a part of memory region among the plurality of memory regions.

(6) The frequency of reading images by the reading unit 33 may be higher than that of the first updating process. In this case, for example, the reading unit 33 continuously reads images for n times from the memory region M1, and continuously reads images for n times, then continuously reads the images for n times from the memory region M3. Note that n is 2 or more of natural number. The above-described modes also correspond to a reading process in accordance with an order.

(7) The time for starting the second updating process may be the same as the end time of the first updating process applied for the memory region which is later in the order, or may be later time than the end time.

(8) Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiment may be omitted. In addition, at least some of the configurations of the above-described embodiment may be added to or replaced with the configurations of the other embodiments described above.

(9) The present disclosure may be also embodied as various modes other than the above-described image processing apparatus, such as a system having a constituent as the image processing apparatus, a program having a computer function as the image processing apparatus, a non-transitory tangible recording media such as semiconductor memory, an image processing method, an image storing method, an image displaying method and the like.

CONCLUSION

According to one aspect of the present disclosure, it is preferable to provide an image processing apparatus and an image display system capable of suppressing a phenomenon where older images remained in the memory unit are displayed on the image display apparatus and detecting false updating.

As one aspect of the present disclosure, an image processing apparatus is provided with an image acquiring unit configured to acquire a first image from an imaging apparatus; an image processing unit configured to perform image processing for the first image; and an image outputting unit configured to output the second image to an image display unit. The image processing unit is provided with a memory unit configured to temporarily store a memory image which is either the first image or the second image. The memory unit includes: a plurality of memory regions; a first updating unit configured to perform a first updating process that updates memory contents of the memory regions using the memory image for each of the plurality of memory regions in accordance with an order set in advance; a second updating unit configured to perform a second updating process that updates memory contents of the memory regions using a specific image having a specific form for each of the plurality of memory regions in accordance with the order; and a reading unit configured to perform a reading process that reads an image stored in the memory regions for each of the plurality of memory regions in accordance with the order. The second updating unit is configured to perform the second updating process after completing the first updating process for the memory region which is later in the order than the memory region to which the second updating process is applied.

According to the image processing apparatus as the one aspect of the present disclosure, in the case where the first updating process is not correctly performed, the image displayed on the display unit is a specific image. Hence, even when the first updating process is not correctly performed, old images which have been stored in the memory regions before performing the first updating process can be prevented from being displayed on the display unit. As a result, the old images displayed on the display unit can be prevented from being misrecognized as the latest image by the user.

What is claimed is:
1. An image processing apparatus comprising:
an image acquiring unit configured to acquire a first image from an imaging apparatus;
an image processing unit configured to perform image processing on the first image; and
an image outputting unit configured to output a second image to an image display unit, wherein the image processing unit is provided with a memory unit configured to temporarily store a memory image which is either the first image or the second image;
the memory unit includes:
a plurality of memory regions;
a first updating unit configured to perform a first updating process that updates memory contents of the memory regions using the memory image for each of the plurality of memory regions in accordance with an order set in advance;
a second updating unit configured to perform a second updating process that updates memory contents of the memory regions using a specific image having a specific form for each of the plurality of memory regions in accordance with the order; and
a reading unit configured to perform a reading process that reads an image stored in the memory regions for each of the plurality of memory regions in accordance with the order, the second updating unit is configured to perform the second updating process after completing the first updating process for the memory region which is later in the order than the memory region to which the second updating process is applied.

2. The image processing apparatus according to claim 1, wherein
the second updating unit is configured to perform the second updating process for the memory region which is at the order one position before the memory region where the latest first updating process is completed.

3. The image processing apparatus according to claim 1, wherein
the reading unit is configured to perform the reading process for the memory region where the latest first updating process is completed;

the memory image is the second image; and the image outputting unit is configured to output the second image read by the reading unit to the image display unit.

4. The image processing apparatus according to claim 1 further comprising:

a determination unit configured to determine whether the memory image read by the reading unit includes the specific image; and a signal outputting unit configured to output a signal indicating a determination result of the determination unit.

5. An image display system comprising:

an image processing apparatus;

an imaging apparatus; and an image display unit, wherein the image processing apparatus comprising:

an image acquiring unit configured to acquire a first image from the imaging apparatus;

an image processing unit configured to perform image processing on the first image; and an image outputting unit configured to output a second image to the image display unit, wherein the image processing unit is provided with a memory unit configured to temporarily store a memory image which is either the first image or the second image;

the memory unit includes:

a plurality of memory regions;

a first updating unit configured to perform a first updating process that updates memory contents of the memory regions using the memory image for each of the plurality of memory regions in accordance with an order set in advance;

a second updating unit configured to perform a second updating process that updates memory contents of the memory regions using a specific image having a specific form for each of the plurality of memory regions in accordance with the order; and a reading unit configured to perform a reading process that reads an image stored in the memory regions for each of the plurality of memory regions in accordance with the order, the second updating unit is configured to perform the second updating process after completing the first updating process for the memory region which is later in the order than the memory region to which the second updating process is applied.

* * * * *